United States Patent [19]

Stelz et al.

[11] 4,436,641
[45] Mar. 13, 1984

[54] REFRIGERATION LIQUID WITH BLUE LEAK INDICATOR AND PROCESS OF USING SAME

[75] Inventors: Dale E. Stelz, Goddard, Kans.; Frank I. Carroll, Durham; Wilson M. Whaley, Cary, both of N.C.

[73] Assignee: Racon Incorporated, Wichita, Kans.

[21] Appl. No.: 444,884

[22] Filed: Nov. 29, 1982

Related U.S. Application Data

[63] Continuation-in-part of Ser. No. 265,697, May 21, 1981, Pat. No. 4,369,120.

[51] Int. Cl.$^3$ .............................................. C09K 5/04
[52] U.S. Cl. ................................... 252/68; 62/114; 260/378
[58] Field of Search ........................... 252/68; 62/114; 260/378

[56] References Cited

U.S. PATENT DOCUMENTS

3,770,640 11/1973 Bartlett ................................ 252/68
4,083,683 4/1978 Botros ................................ 260/378
4,170,564 10/1979 Brendle ................................ 252/68

Primary Examiner—John E. Kittle
Assistant Examiner—Robert A. Wax
Attorney, Agent, or Firm—Burns, Doane, Swecker & Mathis

[57] ABSTRACT

1,4-Bis(2,4,6-trialkylanilino)anthraquinone wherein the alkyls on each anilino group are selected from the group consisting of methyl and ethyl and one of the three alkyls on each anilino group is different from the other two, e.g. 1,4-bis(2,6-diethyl-4-methylanilino)anthraquinone, is disclosed as an unusually effective blue dye suitable for use as a visual leak indicator in halocarbon refrigerants or in refrigeration liquids comprising a halocarbon refrigerant in admixture with a refrigeration oil.

9 Claims, No Drawings

REFRIGERATION LIQUID WITH BLUE LEAK INDICATOR AND PROCESS OF USING SAME

RELATED APPLICATION

This application is a continuation-in-part of copending application Ser. No. 265,697 filed May 21, 1981, now U.S. Pat. No. 4,369,120 issued Jan. 18, 1983.

BACKGROUND OF THE INVENTION (1) Field of the Invention

The invention relates to refrigeration liquids that are dyed such that they cause a readily visible stain in the event of a leak in the refrigerator system in which they are used. More particularly, it relates to the use of certain unequally substituted 1,4-bis(2,4,6-trialkylanilino)anthraquinones, e.g., 1,6-bis(2,6-diethyl-4-methylanilino)anthraquinone or 1,4-bis(2,4-dimethyl-6-ethylanilino)anthraquinone, as dye in halocarbon refrigerants or in refrigeration liquids composed essentially of a volatile halocarbon refrigerant and a relatively nonvolatile oil that serves as a lubricant for the refrigeration apparatus or other vapor compression heat transfer mechanism in which the composition is used. Still more particularly, the invention relates to refrigeration liquids containing an anthraquinone dye that is deep blue in color, that has a relatively high solubility in the halocarbon as well as the lubricating oil constituting the refrigeration composition, and that has a high degree of stability at the high temperatures and in the chemical environment encountered in a mechanical refrigeration cycle. The invention likewise relates to the use of such dyed refrigeration liquids in a refrigeration process wherein the presence of a stable dye is capable of serving as a conspicuous leak indicator in the event of a leak occurring in the course of a long period of operation.

(2) The State of the Art

It has been known in the art to use various dyes to indicate the occurrence and location of leaks in mechanical refrigeration systems employing refrigerants composed of mixtures of fluorocarbons and a refrigeration oil. For instance, U.S. Pat. No. 3,370,013 describes such a refrigerant composition using an azo dye or a mixture of azo dyes as a leak indicator. Other dyes were proposed previously in U.S. Pat. No. 1,915,965 for a similar purpose. More recently, the use of certain anthraquinone dyes has been proposed for this purpose in U.S. Pat. No. 3,770,640 (Bartlett) and U.S. Pat. No. 4,170,564 (Brendle).

However, the dyes previously proposed by others have suffered from one or more disadvantages, notably in terms of insufficient chemical or thermal stability, insufficient solubility in the particular refrigerant composition for which they were intended, relatively complex molecular structure and consequent difficulty in manufacturing them, or unsatisfactory color. Obviously, unless the selected dye is sufficiently soluble both in the volatile halocarbon and in the relatively nonvolatile refrigeration oil, leakage of the refrigerant composition containing such a dye will produce an oil stain of insufficient intensity for ready detection.

Proper chemical and thermal stability are particularly important because insufficiently stable dyes gradually change or lose color and may produce a precipitate, thereby losing effectiveness as a leak indicator and impairing the operation of the refrigeration mechanism.

In addition, to yield a commercially acceptable refrigeration composition, the dye (1) must be such as to permit the stains that result in the location of a leak to be easily and essentially completely removed by a solvent such as perchloroethylene, methylene chloride or trichlorofluoromethane; (2) must not cause a significant increase in the pour point of the refrigeration oil; (3) must not have any significant adverse effect on the various materials used in refrigeration apparatus, e.g., elastomeric gaskets, cotton sleeving, mechanical parts made of polyester or nylon; (4) must have no adverse effect on the dielectric strength of the refrigeration oil; and (5) must not raise the floc point of the oil.

Adequate solubility of the dye in the halocarbon-containing refrigerant composition as well as the refrigeration oil used in formulating it is of course a prime importance. More particularly, it is important that the dye be capable of being dissolved in the refrigerant composition in a sufficient concentration to produce the desired intensely colored stain in the event of a leak without precipitating from the composition as it passes through the various evaporation and compression stages of the refrigeration cycle. And it is particularly important that the solubility of the dye in the relatively nonvolatile refrigeration oil be sufficiently high to produce an intensely colored oil stain when the dye-containing composition leaks from the system and the halocarbon refrigerant evaporates, causing the dye present to concentrate in the oil that remains.

Last, but not least, many manufacturers or operators of commercial refrigeration, freezer or air conditioning units or heat pumps insist on using refrigerant compositions that possess an intense blue color, in preference to some other color such as green or red, in order to be able to differentiate a refrigerant leak from a leak of some other fluid in the system; e.g., red motor fuel or hydraulic fluid under the hood of a motor vehicle. The requirement that the dye be blue has further greatly increased the difficulty of finding a dye meeting all the specified requirements.

The use of a narrow class of suitable anthraquinone dyes having a particular characteristic structure has been disclosed and claimed in parent application Ser. No. 265,697 filed May 21, 1981, now U.S. Pat. No. 4,369,120, which meets all of the specified requirements in a surprisingly effective manner. In addition, 1,4-bis(2,6-diethyl-4-methylanilino)anthraquinone and 1,4-bis(2,4-dimethyl-6-ethylanilino)anthraquinone are now presented as dyes that are surprisingly superior to any similar dye previously proposed for this special purpose.

SUMMARY OF THE INVENTION

In the absence of an explicit indication to the contrary, it should be understood at the outset that amounts and proportions of materials are expressed on a weight basis throughout this specification and claims.

In accordance with one of its aspects, this invention provides a deep blue refrigeration liquid comprising a halocarbon refrigerant and a small but effective amount of a blue anthraquinone dye having a structure corresponding to the following formula:

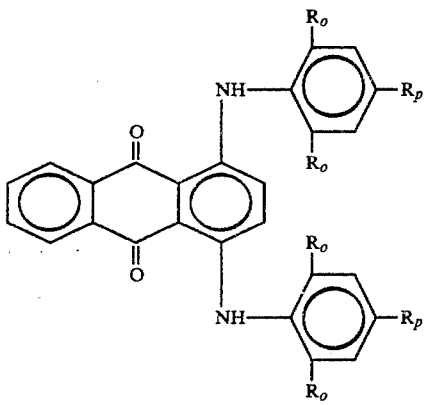

wherein in each anilino nucleus the $R_p$ substituent is methyl, one of the two $R_o$ substituents is ethyl and the other $R_o$ substituent is either methyl or ethyl, such that one of the three Rs of each anilino group is different from the other two. Stated differently, the dye is an individual unequally substituted 1,4-bis(2,4,6-trialkylanilino)anthraquinone dye wherein the three alkyls of each anilino nucleus are non-identical in that its para position is always substituted by methyl, one of its ortho positions always carries an ethyl substituent, and the other ortho position carries either an ethyl or a methyl substituent; or it can be a mixture comprising more than one such individual dye.

As in the case of the dyes disclosed and claimed in parent U.S. Pat. No. 4,369,120, the anthraquinone dyes disclosed herein meet the requirements of this invention because of a certain characteristic chemical structure that is more fully described below. It is this structure that apparently imparts to such dyes not only an intense blue color, but also a surprisingly high degree of desired thermal and chemical stability as well as solubility.

A dye to be suitable for the purposes of this invention must have sufficient solubility in the halocarbon refrigerant so as to impart sufficient color intensity to the refrigeration liquid and eventually to the non-volatile oil stain remaining behind after evaporation of the refrigerant in the event of a leak.

In addition, it is desirable that the solubility of the dye be sufficient to allow its use in a concentration well below its limit of solubility and thereby minimize the risk of the dye's salting out in the refrigeration system.

For instance, it is advantageous for the dye to be soluble in the halocarbon component of the refrigeration liquid in a concentration of at least 0.01% and in the oil component of the refrigeration liquid in a concentration of from between about 0.03% to 1.0% or more. Usually, however, it is sufficient to dissolve the selected dye in the refrigeration liquid, i.e., in the mixture of refrigerant oil and halocarbon refrigerant, in a concentration between about 0.02 to 0.5%, e.g., between about 0.03 and 0.1%, although substantially higher concentrations within the range of solubility of a particular dye in a particular refrigeration liquid may be used if desired.

A blue anthraquinone dye comprising 1,4-bis(2,6-diethyl-4-methylanilino)anthraquinone has been found superior to any similar dye previously used. 1,4-Bis(2,4-dimethyl-6-ethylanilino)anthraquinone is another dye that comes within the scope of this invention.

In another aspect, this invention provides a process for monitoring leaks in a vapor compression heat transfer system by circulating through it the novel blue dye-containing refrigeration liquid described above.

FURTHER DESCRIPTION OF THE INVENTION

The novel blue-colored refrigerant compositions of this invention, which serve to indicate leaks occurring in a vapor compression heat transfer system, are surprisingly effective in terms of stability, solubility and intensity of the blue stain resulting in the event of a leak. The composition comprises a conventional refrigeration liquid in which from about 0.01 to 1.0%, preferably about 0.02 to 0.5%, and most preferably 0.03 to 0.1% of one or more of the particular blue anthraquinone dye described above is dissolved. As halocarbon refrigerants themselves are volatile, it is of course necessary to maintain or store them or refrigeration liquids comprising them in closed containers in order to avoid unwanted evaporation losses.

A refrigeration liquid of the kind to which the present invention is addressed comprises a halocarbon refrigerant mixed with a refined mineral oil having a pour point not higher than about 0° C., e.g., between about −40° C. (−40° F.) and about −65° C. (−85° F.), which serves as a lubricant in the refrigeration system. Instead of mineral oil, suitable synthetic lubricants such as silicone oils, dibasic acid esters or polyglycols may be used similarly. For instance, suitable synthetic oils include 2-ethylhexyl disiloxane, 2-ethylhexyl trisiloxane, esters of polybasic acids such as dibutyl adipate, or various polyglycols, as is otherwise well known. If necessary or desired, a minor proportion of a mineral oil may be used in combination with such synthetic oils in order to increase the solubility of the dyes in the refrigeration liquid to a predetermined level. Because of cost and the solvent effect of many synthetic oils on elastomeric materials such as gaskets used in refrigeration systems, mineral oils are normally preferred to synthetic oils.

Typically, a refrigeration liquid of the kind to which this invention is addressed is a mixture of one or more halocarbon refrigerants and a light lubricating oil having a suitably low pour point or freezing point, wherein the ratio of halocarbon to lubricating oil is from about 10:1 to about 4:6.

As ordinarily sold by manufacturers of halocarbons, the halocarbon refrigerant containing the dye dissolved in it does not contain any substantial proportion of oil, e.g., only between 0 and 2%, usually less than 1% of oil, any such oil being included at this stage mainly to assist in dissolving the dye in the composition. The required proportion of a suitable lubricant is added to the dye-containing refrigerant compositions at a later stage, for instance, by a distributor or the final user.

Halocarbons useful as refrigerants either individually or in the form of azeotropic or non-azeotropic mixtures include:

| Refrigerant Designation | Chemical Name | Normal Boiling Point, °C. |
| --- | --- | --- |
| Aliphatic Compounds | | |
| 11 | Trichlorofluoromethane | 24 |
| 12 | Dichlorodifluoromethane | −30 |
| 12B1 | Bromochlorodifluoromethane | −4 |
| 12B2 | Dibromodifluoromethane | 25 |
| 13 | Chlorotrifluoromethane | −81 |
| 13B1 | Bromotrifluoromethane | −58 |
| 14 | Carbon tetrafluoride | −128 |
| 21 | Dichlorofluoromethane | 9 |

-continued

| Refrigerant Designation | Chemical Name | Normal Boiling Point, °C. |
|---|---|---|
| 22 | Chlorodifluoromethane | −41 |
| 23 | Trifluoromethane | −82 |
| 31 | Chlorofluoromethane | −9 |
| 32 | Methylene fluoride | −52 |
| 40 | Methyl chloride | −24 |
| 41 | Methyl fluoride | −78 |
| 113 | 1,1,2-Trichlorotrifluoroethane | 48 |
| 113a | 1,1,1-Trichlorotrifluoroethane | 46 |
| 114 | 1,2-Dichlorotetrafluoroethane | 4 |
| 114a | 1,1-Dichlorotetrafluoroethane | 4 |
| 114B2 | 1,2-Dibromotetrafluoroethane | 47 |
| 115 | Chloropentafluoroethane | −39 |
| 116 | Hexafluoroethane | −79 |
| 123 | 2,2-Dichloro-1,1,1-trifluoroethane | 27 |
| 124 | 2-Chloro-1,1,1,2-tetrafluoroethane | −12 |
| 124a | 1-Chloro-1,1,2,2-tetrafluoroethane | −10 |
| 125 | Pentafluoroethane | −49 |
| 133a | 2-Chloro-1,1,1-trifluoroethane | 6 |
| 142b | 1-Chloro-1,1-difluoroethane | −10 |
| 143a | 1,1,1-Trifluoroethane | −47 |
| 152a | 1,1-Difluoroethane | −25 |
| 218 | Octafluoropropane | −37 |
| Cyclic Compounds | | |
| C317 | Chloroheptafluorocylobutane | 26 |
| C318 | Octafluorocyclobutane | −6 |
| Azeotropes or Mixtures | | |
| 500 | R-12/152a(73.8/26.2 wt %) | −33 |
| 501 | R-22/12(75/25 wt %) | −41 |
| 502 | R-22/115(48.8/51.2 wt %) | −45 |
| 503 | R-23/13(40.1/59.9 wt %) | −88 |
| 504 | R-32/115(48.2/51.8 wt %) | −57 |
| 505 | R-12/31(78.0/22.0 wt %) | −30 |
| 506 | R-31/114(55.1/44.9 wt %) | −12 |
| — | R-13B1/152a (Non-Azeotrope) | — |

In generic terms, the halocarbon refrigerant is a low-boiling haloalkane or halocycloalkane boiling at a relatively low temperature at atmospheric pressure, e.g., below 30° C., and containing from 1 to 2 carbon atoms if a haloalkane or 1 to 4 carbon atoms if a halocycloalkane, from 1 to 6 fluorine atoms and from 0 to 3 halogen atoms selected from the class consisting of chlorine and bromine. Useful halocarbon refrigerants serve to transfer heat in a refrigeration system by evaporating and absorbing heat at a low temperature and pressure, e.g., at ambient temperature and atmospheric pressure, and by releasing heat of condensing at a higher temperature and pressure.

The refrigeration oils useful in this invention include any of the mineral or synthetic oils that are well known in the art and are commonly used in vapor compression heat transfer apparatus, e.g., naphthenic oils, paraffinic oils, alkylated benzenes, silicones, polyglycols, diesters or triesters of dicarboxylic or tricarboxylic acids or phosphoric acid, and the like. Suitable commercial oils include, among others, "Suniso" 3GS, 4GS or 5GS, which are naphthenic oils manufactured by Sun Co.; "Cappela" D or E, which are naphthenic oils manufactured by Texaco, Inc.; "Delco" 15-117, a paraffinic oil manufactured by Texaco, Inc.; and "Zerice" S-41, an alkylated benzene oil manufactured by Exxon Corporation.

The blue anthraquinone dyes useful in this invention are of a kind that is otherwise well known in the dye-making art and at least one such dye is commercially available from one of the major dye manufacturers in the United States. Dyes of this type can be prepared by otherwise well known methods of synthesis. For instance, 1,4-bis(2,6-diethyl-4-methylanilino)anthraquinone can be made by condensing leucoquinizarin with 2,6-diethyl-4-methylaniline and then oxidizing the intermediate product in an otherwise conventional manner. Such a method of synthesis is illustrated, for instance, in U.S. Pat. No. 4,083,683, which patent discloses and claims the use of 1,4-bis(2-methyl-6-ethylanilino)anthraquinone for dyeing metal-containing polypropylene fibers. More generally speaking, all such dyes may be prepared by causing a haloanthraquinone to react with the proper alkyl-substituted aniline in suitable proportions, as disclosed, for example, in U.s. Pat. Nos. 2,091,812 and 2,101,094; or by causing a diaminoanthraquinone to react with the proper alkyl-substituted bromobenzene as disclosed in U.S. Pat. No. 2,598,820.

For an anthraquinone dye to be best suited for the purposes of this invention, it preferably has to possess trialkylanilino groups located both in the 1 position and in the 4 position of an anthraquinone molecule wherein two $C_1$–$C_2$ alkyl radicals (both preferably being ethyl but one ethyl and one methyl also being practicable) are attached in the ortho positions of each anilino group and a methyl radical is attached to each anilino group in the para position.

More particularly, by reference to Table I below it can be appreciated that such ortho substitution has a remarkably beneficial effect on the stability of the dyes in the the accelerated sealed tube test used for evaluation; additionally, the dissimilar third alkyl substitution remarkably increases its solubility both in refrigerant and oil. The first dye listed, No. 101-M, which embodies this invention, as well as the next three dyes listed which embody the principles of the invention disclosed and claimed in parent U.S. Pat. No. 4,369,120, are seen to survive intact in excess of twenty days in the sealed tube test at 350° F. (176.7° C.), which is equivalent to many years of normal use in a refrigeration system. Most remarkably, the dye of this invention, No. 101-M, withstood the rigors of the test longer than 30 days, i.e., it was at least as stable under these test conditions as the best dye previously proposed for this purpose in the parent patent. In sharp contrast, the remaining twenty-five dyes listed in Table I, which do not possess the special structural features described either in this specification or in parent U.S. Pat. No. 4,369,120, in all but one case failed the sealed tube test in a relatively short time, e.g., in less than thirteen days or often in less than five days.

As a result of a lengthy search for a superior blue dye it finally became clear that for supreme stability and good solubility it was necessary for the amino nitrogen atoms of the anilino groups to be shielded by small alkyls, i.e., ethyls or methyls, in the ortho positions, and that increased solubility was aided by a methyl placed in the para position. At first it was thought that steric shielding alone would be an adequate explanation for the enhanced stability of the claimed dyes, but a number of observations contradict such a simple explanation. For instance, U.S. Pat. No. 3,770,640 reports that 1,4-bis(2,4,6-triethylanilino)anthraquinone was found to be unstable in the sealed tube test at 400° F. (204.4° C.), even though this dye possesses ortho substitution on its anilino groups and additionally contains an ethyl in the para position. The higher test temperature referred to in U.S. Pat. No. 3,770,640 does not account for the reported poor stability, as our dyes performed well at elevated temperatures.

Although 1,4-bis(2,4,6-triethylanilino)anthraquinone has been disclosed in U.S. Pat. No. 3,770,640 among the dyes the patentee considered useful, and although its structure differs from the preferred dye of the instant invention only in having an ethyl in place of a methyl substituent in the para position on the anilino groups, its stability in the sealed tube test is clearly less than that of the now disclosed and claimed 1,4-bis(2,6-diethyl-4-methylanilino)anthraquinone. 1,4-Bis(N-methyl-4-n-butylanilino)anthraquinone, which likewise falls within the scope of the disclosure of U.S. Pat. No. 3,770,640, has also been found very unstable when prepared and tested. The reported instability for the 2,4,6-triethylanilino dye and the instability found in the case of the N-methyl-4-n-butylanilino dye made the superior performance of the dyes covered in this invention entirely unanticipated and surprising.

Other dyes that provide steric shielding of the amino nitrogen atoms but are nevertheless very unstable are those in Table I with the following anthraquinone substituents: 1,4-bis(neopentylamino) (No. 15-13), 1,4-bis-(N-methylanilino) No. 16-10), 1,4-bis(N-ethylanilino) (No. 17-14), 1,4-bis(N-methyl-4-n-butylanilino) (No. 18-6), 1,4-bis(N-methyl-4-ethoxyanilino) (No. 19-9), 1,4-bis(N-methyl-4-butoxyanilino) (No. 20-12), 1,4-bis(4-n-butylanilino)-2-methyl (No. 22-16) and 1,4-bis(2-trifluoromethylanilino) (No. 23-24).

To produce the desired ultimate color intensity, it is apparently important that the dye possess the smallest possible molecule that will produce the desired color while having maximum solubility, and this invention achieves this by using anthraquinone dyes wherein the 2,4,6-trialkylanilino groups carry as the three alkyls a mixture of both methyl and ethyl substituents.

The degree of purity may affect the stability of dyes to some extent, but is believed to be much less important in the kind of dye used in this invention than has been suggested in the prior art with respect to other anilino-anthraquinone dyes. More particularly, U.S. Pat. No. 3,770,640 teaches that in the case of the dyes disclosed there it is highly important that unreacted alkyl aniline reactant be removed from the product dye at least to the extent that less than about 0.5 weight percent of the aniline remains in the dye mixture, implying that the dyes must be chromatographically pure.

By contrast, in the case of the class of dyes disclosed in parent application Ser. No. 265,697, now U.S. Pat. No. 4,369,120, dye samples having a purity as low as 89% were found to possess sufficient stability to give a mean life greater than 15 days in the sealed tube test at 350° F., and samples of the same dye having a purity of 95% or more were found to give a mean life of 24 days or more in this test. Accordingly, while a high degree of dye purity is generally advantageous, it can be concluded by analogy that the present invention can be successfully operated with dyes that are between 85 and 100% pure, preferably between 90 and 100% pure, and most preferably between about 95 and 98% pure, but which do not necessarily require chromatographic purification.

The effect of impurities on dye stability as measured in the sealed tube test is illustrated by the data in the following table:

| EFFECT OF IMPURITIES ON THE STABILITY OF DYE NO. 1-35 | | | |
|---|---|---|---|
| Samples of Dye No. 1-35 | max. at 625 nm | Purity, % | Mean Life, Days at 350° F. |
| A and B | 17,553 | 100* | 30+ |
| C | 17,016 | 97 | 24.0 |
| D | 16,751 | 95 | 24.0 |
| E | 15,500 | 89 | 17.0 |
| F | 11,434 | 65 | 5.0 |

*By definition

The impurities in the above table were calculated from spectral absorption data on the basis of the follwing assumptions: (1) Chromatographically purified samples were assumed to be 100% pure (by definition); (2) Beer's Law was assumed to apply to these dyes; and (3) the impurities were assumed not to absorb light at the wavelength used to calculate the conversion coefficient.

EXAMPLE

To illustrate the effectiveness of the invention, numerous refrigeration liquids containing a variety of anthraquinone dyes were subjected to a standard sealed tube test that the American Society of Heating, Refrigeration and Airconditioning Engineers has proposed for the purpose of determining the stability of refrigeration liquids (See ASHRAE Transactions, Jan. 25–28, 1965). Manufacturers of refrigeration equipment generally demand that any refrigeration liquid satisfactorily pass such a sealed tube test before they approve the liquid for use in their equipment. In addition, the solubility of the various dyes in oil and in refrigerant were determined.

The sealed tube test serves as a method of evaluating in an accelerated manner interactions of materials found in a refrigeration system. As can be seen from Table I below, the test results obtained demonstrate both the extraordinary stability and simultaneously the extraordinary solubility in oil/refrigerant mixtures of ortho substituted anilino dyes containing both ethyl and methyl groups in the presence of representative materials of construction.

TEST PROCEDURE

Glass tubes and all metal test coupons are scrupulously cleaned. Test refrigerants are distilled to minimize moisture contamination. Moisture is removed from the refrigeration test oil, "Suniso" 3GS, by subjecting the oil to a vacuum with slight stirring and heating. Ratios of refrigerant/refrigerant oil range from 1:1 to 1:2 by weight.

Refrigerant oil and representative metal coupons of copper #10AWG wire, Swedish valve stock steel, and aluminum metal sheet are placed in a glass tube along with the subject test dye material (0.25–1.0% wt/wt) dissolved in the refrigerant oil. Like samples without the subject dye are analyzed as controls.

The tube and its contents are chilled in a liquid nitrogen bath while the refrigerant is condensed into the tube via a calibrated manometer. The tube is sealed under a vacuum of at least 0.1 torr.

Glass tubes and contents are subjected to uniform heating in a bored aluminum block placed in a temperature programmed oven.

The oven temperatures used vary according to the test refrigerant, as indicated:

| Refrigerant | Temperature |
|---|---|
| R-12 | 176.7° C. (350° F.) |
| R-22 | 200° C. (392° F.) |
| R-502 | 200° C. (392° F.) |

The test is run for one of the following time periods: 5, 14, 21 or 30 days.

The tube contents may be evaluated by several methods:
Visual examination
Analysis of chloride ion
Gas chromatography analysis
Infrared spectrometry
Mass spectrometry.

Of these methods, the visual examination is the most rapid and the only qualitative method. Any color change in the subject dye coloration is noted when compared to a control sample.

The quantitative methods involve analysis for decomposition products of chloride as hydrochloric acid or organic products by gas chromatography, infrared spectroscopy, or mass spectroscopy. However, visual inspection and gas chromatography are widely used, and they were selected as standardization procedures for evaluation of sealed tube contents.

R-12 is chemically one of the more reactive refrigerants; thus, short term tests with refrigeration liquids containing this refrigerant admixed with a mineral oil yield the most rapid results. R-22 and R-502 are also used but the decomposition products are more difficult to analyze by gas chromatography. Ultimately the test material must pass interactions involving any of these refrigerants. The visual method can be used empirically on a pass-fail basis. As verified experimentally, visual results are considered as valid as instrumental methods.

Solubility of various dyes in various refrigeration oils was carefully determined according to the following standardized procedure. An excess of the subject dye was added to a given weight (e.g., 100 g) of refrigerant oil. The mixture was stirred for one-half hour with mild heating, whereupon it was cooled to room temperature (about 21° C.) and transferred to a centrifuge tube. The mixture was centrifuged approximately 15 minutes at 1000 rpm. A sample of the supernatant liquid was decanted (1.00 g±0.01 g) and diluted to 100 ml volume with methylene chloride. Aliquot portions were taken and read against the principal absorption peaks by visible light spectroscopy. Wt/wt percentage concentrations were then calculated from proper standard curves.

The dye should be soluble in the selected refrigeration oil in a concentration of at least 0.005 g/100 g, preferably at least 0.007 g/100 g, i.e., in a concentration that produces a blue oil solution of sufficient color intensity to serve as a visual leak detector. The upper limit of the concentration range in which the dye is dissolved in the refrigeration liquid for commercial use is generally dictated only by cost considerations and by the need to remain safely below the maximum dye solubility so as to avoid precipitation of the dye from the liquid while in use. As the dyes that form the basis for this invention are soluble in the ordinarily used refrigeration oils in a concentration of from about 5.0 to about 6.5 g/100 g, they are readily dissolved in the refrigeration liquid, e.g., in a mixture containing 3 parts of a halocarbon such as dichlorodifluoromethane and 1 part of a naphthenic oil such as Suniso 3GS, in a concentration of between about 0.02 and 0.5%, e.g., 0.1%.

Solubilities of various dyes in various halocarbon refrigerants were also determined according to the following standardized procedure. Approximately 0.1000 g±0.1 mg of the subject dye was dissolved in a small amount of trichlorofluoromethane (refrigerant R-11) and diluted with additional R-11 to 50 ml volume. A 2 ml aliquot was taken and added to a clear glass tube (9 mm OD). The R-11 was allowed to vaporize, leaving a known amount of dye in the bottom portion of the test tube. The tube was then attached to a charging apparatus containing a supply of a given halocarbon refrigerant and various amounts of the refrigerant were charged into the tube while chilling the latter by immersion in liquid nitrogen. The tube containing the dye refrigerant mixture was sealed under vacuum, allowed to reach room temperature (about 21° C.) and rotated for several hours. Visual inspection of the tube was made at several temperatures to note the degree of dissolution. The procedure was improved over previously used methods in that an exact predetermined amount of dye and refrigerant were made to interact, requiring fewer weighings. Finally, it became possible to use the same tube to check solubility at several different temperatures.

Representative stability data as well as certain solubility data obtained with the various dyes are summarized in Tables I and IA. Additional data showing the solubility of various dyes in refrigeration oil and summarized in Table II and further data showing the solubility of various dyes in various refrigerants are summarized in Table III.

The No. 101-M dye in R-12 and in R-22 was also evaluated in a sealed tube test in the customary manner at 109° C. (225° F.) for its compatibility with representative materials of construction, and in each case was determined to be stable in excess of 30 days. The materials of construction in these tests included Mylar polyester straw, Mylar sleeve material, a rubber asbestos seal, a paper gasket, Lecton sleeving, Nomex cell paper, nylon string, a Neoprene rubber O-ring, and heavy armored wire enamel. That dye No. 101-M showed such high stability with all of these materials is of very great practical importance.

Dye No. 101-M was also evaluated in a standard floc test, its effect on the dielectric constant of refrigeration oil was determined, and it was subjected to the ASTM D97-66 pour point test, which it readily passed. The results of the floc test and the dielectric constant measurements are summarized in Tables IV and V, respectively.

Finally, an extended series of field tests, including automobile air conditioning, an air conditioning system in a building, and laboratory air conditioning test units, and all of these tests showed that the inclusion of dye No. 101-M in any such air conditioning system permitted a trouble-free operation.

TABLE I

BLUE ANTHRAQUINONE DYES
Sealed Tube Data In "R-12" At 350° F. (177° C.)

| Dye No. | Substituents | Stability, Mean Life | Oil Sol. In 3GS | Refr. Sol In R-12 |
|---|---|---|---|---|
| 101-M | 1,4-Bis(2,6-diethyl-4-methylanilino) | 30 + days | 6.3% | 0.6% |
| 1-35 | 1,4-Bis(2-methyl-6-ethylanilino) | 30 + | 4.8 | 0.2 |
| 2-31 | 1,4-Bis(2,6-dimethylanilino) | 22.4 | 0.1 | <0.1 |
| 3-25 | 1,4-Bis(mesidino) | 29.0 | 0.55 | <0.1 |
| 4-1 | 1,4-Bis(4-n-butylanilino) | 9.5 | <1.0 | — |
| 5-5 | 1,4-Bis(4-cyclohexylanilino) | 9.7 | 0.1 | — |
| 6-21 | 1,4-Bis(4-t-butylanilino) | 8.7 | <1.0 | — |
| 7-3 | 1,4-Bis(4-ethoxyanilino) | 8.5 | 1.0 | — |
| 8-2 | 1,4-Bis(4-n-butoxyanilino) | 8.6 | 0.02 | — |
| 9-8 | 1,4-Bis($\beta$-phenethylamino) | 4.4 | 0.1 | — |
| 10-19 | 1,4-Bis(benzylamino) | 4.5 | <0.25 | — |
| 11-17 | 1,4-Bis($\alpha$-methylbenzylamino) | 3.5 | 1.0 | — |
| 12-20 | 1,4-Bis(diphenylmethylamino) | 2.0 | <0.05 | — |
| 13-27 | 1,4-Bis(n-octylamino) | 4.4 | 0.5 | — |
| 14-32 | 1,4-Bis(n-dodecylamino) | 2.3 | 0.5 | — |
| 15-13 | 1,4-Bis(neopentylamino) | 3.4 | <1.0 | — |
| 16-10 | 1,4-Bis(N—methylanilino) | 7.0 | 0.1 | — |
| 17-14 | 1,4-Bis(N—ethylanilino) | 4.5 | 1.0 | — |
| 18-6 | 1,4-Bis(N—methyl-4-n-butylanilino) | 4.3 | 0.1 | — |
| 19-9 | 1,4-Bis(N—methyl-4-ethoxyanilino) | 6.0 | 0.1 | — |
| 20-12 | 1,4-Bis(N—methyl-4-n-butoxyanilino) | 4.0 | 0.1 | — |
| 21-11 | 1-(4-n-butylanilino)-4-(p-toluidino) | 7.7 | 0.1 | — |
| 22-16 | 1,4-Bis(4-n-butylanilino)-2-methyl) | 3.0 | 1.0 | — |
| 23-24 | 1,4-Bis(2-triflruoromethylanilino) | 6.5 | 0.5 | — |
| 24-49 | 1,4-Bis(2,5-dimethyl) | 12 | — | — |
| 25-47 | 1,4-Bis(3,5-dimethyl) | 4.5 | — | — |
| 26-51 | 1,4-Bis(2,6-diethyl) | 12.25 | — | — |
| 27-37 | 1,4-Bis(2,6-diisopropyl) | 19 | — | — |

The sealed tube data shown in Table I clearly demonstrate the superiority of the dye falling within the scope of this invention (No. 101-M) over all other, similar dyes.

TABLE I-A

Stability of Dye No. 101-M in Different Refrigerants at Different Temperatures

| Dye No. | Refrigerant | Temperature, °C. | Stability, Mean Life, Days |
|---|---|---|---|
| 101-M | R-12 | 177 | 30+ |
| 101-M | R-22 | 200 | 37+ |
| 101-M | R-502 | 200 | 30+ |

It should be remembered that the dye used preferably should not have an adverse effect on the pour point or the floc point of the refrigeration oil, and the dye falling within the compass of this invention can satisfy this criterion without extensive purification. Preferably the dye used should contain less than about 10%, preferably less than about 5%, of unreacted aniline compounds. A high degree of purity is always advantageous but is less important to dye stability in the case of the relatively simple chemical structures required in this invention than in the case of other, more complex structures.

The solubility of the preferred dye, 1,4-bis(2,6-diethyl-4-methylanilino)anthraquinone (Dye No. 101-M), in various commercially used refrigeration oils was determined. The results are summarized in Table II below.

TABLE II

Dye Solubility in Refrigeration Oils Comparison Between Dyes No. 101-M and 1-35

| | Solubility, % (wt/wt) | |
|---|---|---|
| Brand of Oil | Dye No. 101-M | Dye No. 1-35 |
| Suniso 3GS, Naphthenic oil | 6.3 | 4.8 |
| Suniso 4GS, Naphthenic oil | 5.9 | 4.6 |

TABLE II-continued

Dye Solubility in Refrigeration Oils Comparison Between Dyes No. 101-M and 1-35

| | Solubility, % (wt/wt) | |
|---|---|---|
| Brand of Oil | Dye No. 101-M | Dye No. 1-35 |
| Suniso 5GS, Naphthenic oil | 6.2 | 4.8 |

As the results show, the preferred dye No. 101-M is soluble in representative naphthenic refrigeration oils in a concentration of about 6%, which is nearly 30% greater than the solubility of dye No. 1-35. Generally speaking, a concentration of at least about 0.02 g dye per 100 g refrigeration oil is required in order to provide a sufficiently dark oil stain to serve as a visual indicator in the event of leakage, and ordinarily the concentration of dye in a commercial refrigeration liquid composed of halocarbon refrigerant and refrigeration oil will be in the range of from about 0.05 to 0.2%. However, it is of great practical importance that the dye used be soluble in the refrigeration oil in a multiple of such concentration, e.g., in a concentration of at least 0.3% and preferably 0.5% or greater. This is desirable in order to provide a substantial margin of safety against precipitation or salting out of the dye in a refrigeration system in the event volatile refrigerant is lost from the system and the dye concentration builds up in the refrigeration oil that stays behind. By providing a suitably large margin of safety, the operator can repeatedly replenish the system by adding the regular dyed refrigeration liquid formulated according to this invention, without fear of causing the concentration of the dye in the system to build up beyond its limit of solubility.

The solubility of the preferred dye of this invention in various halocarbon refrigerants was also determined and compared with the corresponding solubility of the No. 1-35 dye. The results are shown in Table III.

TABLE III

Solubility of Dyes No. 101-M and No. 1-35
In Various Refrigerants at 77° F.(25° C.)

| Refrigerant | Solubility, % (wt/t) at Indicated Temperature | |
| --- | --- | --- |
| | Dye No. 101-M | Dye No. 1-35 |
| R-12 | 0.6 | 0.2 |
| R-22 | 0.4 | 0.4 |
| R-502 | 0.2 | 0.1 |

Refrigerant solubility of Dye No. 101-M is measurably better than that of No. 1-35 in both R-12 and R-502.

It should be particularly kept in mind that as long as the solubility of a dye in the halocarbon exceeds a certain minimum, e.g., 0.01%, the objectives of the invention can be achieved as long as the solubility of the dye in the refrigeration oil also exceeds the indicated minimum of at least 0.07% and most preferably is above 0.3% based on the oil. Inasmuch as the dyes are ordinarily much more soluble in the refrigeration oils than in the halocarbons, a relatively low solubility of the dye in halocarbons usually suffices.

TABLE IV

FLOC TEST (After ASHRAE Method)*

| | Temp., °C. |
| --- | --- |
| Suniso 3GS oil (no dye) | −63 |
| Suniso 3GS oil + 0.1% No. 101-M dye | −65 |
| Suniso 3GS oil + 0.2% No. 101-M dye | −68 |
| | −51° (max) |

*Specification

All of the above values are seen readily to meet and exceed the specification figure of −51° C.

TABLE V

DIELECTRIC CONSTANT
(GE Oil Testing Apparatus, Kansas Gas and Electric Co. Labs)

| Suniso 3GS oil | 22,000 volts |
| --- | --- |
| Suniso 3GS oil + 0.1% No. 101-M dye | 28,000 |
| Suniso 3GS oil + 0.2% No. 101-M dye | 23,000 |

All of the above test values exceed the requirements for electrical transformer oil.

The foregoing has been provided for the purpose of describing the nature and scope of the invention and suitable modes of using it. It should be understood, however, that the invention is not limited to the exact details described and that modifications may be made therein without departing from the spirit of the invention disclosed and claimed.

What is claimed is:

1. A blue liquid refrigerant composition capable of use as a leak indicator which comprises (a) at least one oil-soluble halocarbon selected from the group consisting of octafluoropropane, octafluorocyclobutane, chloroheptafluorocyclobutane and haloalkanes containing from one to two carbon atoms, from one to six fluorine atoms and from zero to three halogen atoms selected from the group consisting of chlorine and bromine and boiling at a temperature below about 30° C. at atmospheric pressure, and (b) an effective colorant amount of a blue anthraquinone dye corresponding to the formula

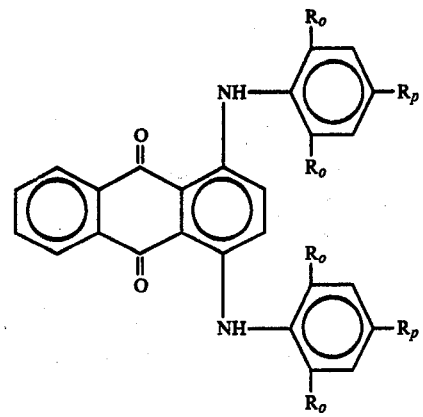

wherein each $R_p$ is methyl, at least one $R_o$ on each anilino group is ethyl, and the other $R_o$ of each anilino group is either methyl or ethyl.

2. A liquid composition according to claim 1 wherein the dye is 1,4-bis(2,6-diethyl-4-methylanilino)anthraquinone and is present in the composition in a concentration of at least 0.01%.

3. A liquid composition according to claim 1 wherein the dye is 1,4-bis(2,4-dimethyl-6-ethylanilino)anthraquinone and is present in the composition in a concentration of at least 0.01%.

4. A liquid composition according to claim 1 wherein the halocarbon is selected from the group consisting of trichlorofluoromethane, dichlorodifluoromethane, chlorodifluoromethane and an azeotrope of chlorodifluoromethane mixed with chloropentafluoroethane, and wherein the dye is dissolved in the composition in a concentration of at least 0.01%.

5. A leak detecting composition according to claim 4 wherein the dye is 1,4-bis(2,6-diethyl-4-methylanilino)anthraquinone and the composition comprises a refrigeration oil in addition to the halocarbon and the dye, the halocarbon being present in the composition in a proportion in the range from about 40 to about 90% and the refrigeration oil being correspondingly present in a proportion in the range from about 60 to about 10%.

6. A process for monitoring leaks in a vapor compression heat transfer system which comprises circulating through said system a composition as defined in claim 5.

7. A blue, leak-indicating refrigeration liquid which comprises
   (a) at least one oil-soluble halocarbon selected from the group consisting of octafluoropropane, octafluorocyclobutane, chloroheptafluorocyclobutane and haloalkanes containing from one to two carbon atoms, from one to six fluorine atoms and from zero to three halogen atoms selected from the group consisting of chlorine and bromine and boiling at a temperature below about 30° C. at atmospheric pressure,
   (b) a refrigeration oil composed essentially of a refined mineral oil having a pour point of between about 0° and −50° C., and
   (c) a blue anthraquinone dye corresponding to the formula

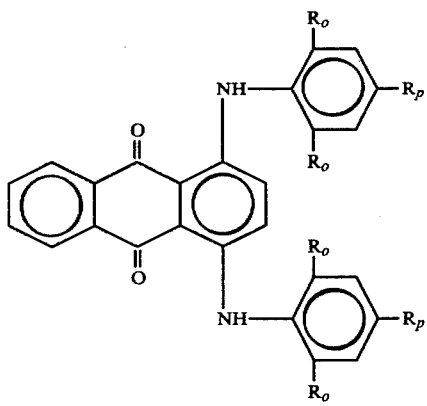

wherein each $R_p$ is methyl, one $R_o$ of each anilino group is ethyl, and the other $R_o$ of each anilino group is either methyl or ethyl, and wherein the proportion of halocarbon to refrigeration oil is between about 10:1 and about 4:6 and wherein the concentration of dye in the liquid is between about 0.01 and 0.5%.

8. A leak-indicating refrigeration liquid according to claim 7 wherein the halocarbon is selected from the group consisting of trichlorofluoromethane, dichlorodifluoromethane, chlorodifluoromethane, trifluoromethane, chlorofluoromethane, methylene fluoride, bromotrifluoromethane, chlorotrifluoromethane, chloropentafluoroethane, 1,1-difluoroethane, and azeotropes of two or more of the foregoing wherein the refrigeration oil is a naphthenic oil, and wherein the dye comprises 1,4-bis(2,6-diethyl-4-methylanilino)anthraquinone.

9. A process for monitoring leaks in a vapor compression heat transfer system which comprises circulating through said system a composition as defined in claim 8.

* * * * *

UNITED STATES PATENT AND TRADEMARK OFFICE
CERTIFICATE OF CORRECTION

PATENT NO. : 4,436,641

DATED : March 13, 1984

INVENTOR(S) : Stelz et al.

It is certified that error appears in the above-identified patent and that said Letters Patent is hereby corrected as shown below:

Col. 1, line 17, 1,6-bis(2,6-diethyl-4-methylanilino)anthraquinone should be 1,4-bis(2,6-diethyl-4-methylanilino)anthraquinone;

Col. 6, line 12, U.s. should be U.S.;

Col. 7, line 23, No. 16-10) should be (No. 16-10);

Col. 7, line 27, 1,4-bis(N-methyl-4-butoxyanilino) should be 1,4-bis(N-methyl-4-n-butoxy anilino);

Col. 8, line 14, follw should be follow;

Table I, Compound 22-16, Change 1,4-Bis(4-n-butylanilino)-2-methyl) to 1,4-Bis(4-n-butylanilino-2-methyl);

Table III, change title "Solubility,%(wt/t)" to Solubility,% (wt/wt).

Signed and Sealed this

Eighteenth Day of September 1984

[SEAL]

Attest:

GERALD J. MOSSINGHOFF

Attesting Officer

Commissioner of Patents and Trademarks